United States Patent
El-Kik et al.

(10) Patent No.: US 7,032,120 B2
(45) Date of Patent: Apr. 18, 2006

(54) METHOD AND APPARATUS FOR MINIMIZING POWER REQUIREMENTS IN A COMPUTER PERIPHERAL DEVICE WHILE IN SUSPEND STATE AND RETURNING TO FULL OPERATION STATE WITHOUT LOSS OF DATA

(75) Inventors: Tony S. El-Kik, Allentown, PA (US); Richard Joseph Niescier, Bethlehem, PA (US)

(73) Assignee: Agere Systems Inc., Allentown, PA (US)

( * ) Notice: Subject to any disclaimer, the term of this patent is extended or adjusted under 35 U.S.C. 154(b) by 548 days.

(21) Appl. No.: 10/197,719

(22) Filed: Jul. 18, 2002

(65) Prior Publication Data

US 2004/0015732 A1    Jan. 22, 2004

(51) Int. Cl.
  *G06F 1/32* (2006.01)
  *G06F 1/26* (2006.01)
(52) U.S. Cl. ...................... 713/320; 713/300
(58) Field of Classification Search ................ 713/300, 713/320
  See application file for complete search history.

(56) References Cited

U.S. PATENT DOCUMENTS

| | | | |
|---|---|---|---|
| 5,652,895 A | 7/1997 | Poisner ..................... 395/750 |
| 5,675,812 A | 10/1997 | Nagashige et al. ......... 395/750 |
| 5,675,813 A | 10/1997 | Holmdahl .................. 395/750 |
| 5,696,897 A | 12/1997 | Dong ..................... 395/182.13 |
| 5,767,844 A | 6/1998 | Stoye ........................ 345/212 |
| 5,784,628 A | 7/1998 | Reneris ................. 395/750.01 |
| 5,799,196 A | 8/1998 | Flannery ................ 395/750.03 |
| 5,884,086 A | 3/1999 | Amoni et al. ........... 395/750.01 |
| 5,884,088 A | 3/1999 | Kardach et al. ........ 395/750.06 |
| 5,919,263 A | 7/1999 | Kikinis et al. .............. 713/320 |
| 5,987,614 A | 11/1999 | Mitchell et al. ............ 713/300 |
| 6,085,325 A | 7/2000 | Jackson et al. ............. 713/300 |
| 6,088,807 A | 7/2000 | Maher et al. ............... 713/324 |
| 6,105,097 A | 8/2000 | Larky et al. ................ 710/129 |
| 6,105,142 A | 8/2000 | Goff et al. .................. 713/324 |
| 6,115,823 A | 9/2000 | Velasco et al. ............. 713/322 |
| 6,128,104 A * | 10/2000 | Okabe et al. ............... 358/442 |
| 6,128,743 A | 10/2000 | Rothenbaum ............... 713/300 |
| 6,128,747 A | 10/2000 | Thoulon ..................... 713/330 |

(Continued)

*Primary Examiner*—Thomas Lee
*Assistant Examiner*—Ji H. Bae
(74) *Attorney, Agent, or Firm*—Synnestvedt Lechner & Woodbridge LLP

(57) ABSTRACT

The invention is a method and apparatus for minimizing power consumption in a computer peripheral device during suspend state and waking up from suspend state without losing pre-suspend configuration information. The power supply to the peripheral device is split into two power rails, namely, a first rail that is unswitched and a second rail that is switched. The switched power rail provides power to components of the peripheral device other than the bus interface circuit. The unswitched power rail provides power to the bus interface circuit. When the device enters suspend mode, first power is removed from the components other than the bus interface circuit, then all outputs from the other components of the peripheral device to the bus interface circuit and all of the outputs from the bus interface circuit to the other components are forced to logic level 0 so that they do not float during suspend mode, and then finally the clock is disabled. When the device wakes up, power is first restored to the components, then the clock is turned on, and finally the outputs of the various components are released from logic level 0.

24 Claims, 2 Drawing Sheets

U.S. PATENT DOCUMENTS

| | | |
|---|---|---|
| 6,178,514 B1 | 1/2001 | Wood .......................... 713/300 |
| 6,256,682 B1 | 7/2001 | Gudan et al. ................. 710/14 |
| 6,272,642 B1 | 8/2001 | Pole, II et al. .............. 713/300 |
| 6,272,644 B1 | 8/2001 | Urade et al. ................. 713/320 |
| 6,282,666 B1 | 8/2001 | Bays et al. .................. 713/323 |
| 6,314,523 B1 | 11/2001 | Voltz .......................... 713/324 |
| 6,345,364 B1 | 2/2002 | Lee ............................ 713/324 |
| 6,347,379 B1 | 2/2002 | Dai et al. .................... 713/320 |
| 6,654,817 B1 * | 11/2003 | Huang ......................... 710/1 |
| 6,671,814 B1 * | 12/2003 | Kubo et al. ................. 713/324 |

* cited by examiner

METHOD AND APPARATUS FOR MINIMIZING POWER REQUIREMENTS IN A COMPUTER PERIPHERAL DEVICE WHILE IN SUSPEND STATE AND RETURNING TO FULL OPERATION STATE WITHOUT LOSS OF DATA

FIELD OF THE INVENTION

The invention pertains to placing a computer peripheral device in a suspend state with reduced power consumption. More particularly, the invention pertains to a technique and apparatus for placing a USB compliant device in suspend mode while meeting the USB suspend mode power requirements and returning to full operational mode without the loss of information.

BACKGROUND OF THE INVENTION

Several years ago, a new Universal Serial Bus (USB) specification was created to provide a standardized interconnect for computer peripheral devices and to facilitate the connection of those devices to the computer. There are several versions of the USB, the latest being the Universal Serial Bus Revision 2.0 Specification. Applicant incorporates all USB specifications, revisions and errata sheets herein by reference. The USB allows computer peripheral devices to connect to a computer through a standardized interface, thus replacing multiple, different cable designs with a single cable design and standard electrical specification. USB buses are differentially driven and thus comprise two data lines, D+ and D−. They further comprise a third line from which the peripheral devices can draw power. The USB design permits peripheral devices to be connected and disconnected from the bus while the computer is powered up and operational. Even further, the USB specification provides a protocol by which a peripheral device can be connected to the USB and detected by the computer, which can then automatically run a configuration process for the device. More particularly, a USB peripheral device may be line powered, i.e., it receives its power via the USB bus.

The USB specification also provides that a USB bus and the devices connected to the bus can be placed in a suspend state if certain events occur. For instance, if there is no activity on the USB bus for more than 30 milliseconds, the peripheral device is placed in suspend state in order to minimize power consumption. In accordance with the USB specification, a peripheral device connected to a USB bus may draw no more than 500 microamps from the USB bus when in suspend state.

Commonly, a computer peripheral device will have configuration information that needs to be maintained for when the device wakes up again from suspend mode. Various techniques have been developed in the prior art to maintain configuration data while a peripheral device is in suspend mode.

In accordance with at least one technique, the data that must be maintained is written into a non-volatile memory before the device enters suspend mode. When the device awakens from suspend mode, the data is written back out from the non-volatile memory into the appropriate registers or other locations.

In accordance with another technique, the electronic components of the peripheral device are maintained in a powered up state, but the internal clocks are shut down. This latter technique is disadvantageous because the memory modules (static RAM) inside the peripheral device tend to have high leakage currents, especially high-speed devices. Accordingly, they draw a significant amount of current in order to maintain their states.

Accordingly, it is an object of the present invention to provide an improved method and apparatus for placing a peripheral device in suspend state with minimal current draw while maintaining its pre-suspend, configuration data.

SUMMARY OF THE INVENTION

The invention is a method and circuitry for minimizing power consumption in a computer peripheral device, such as a modem, during suspend mode and waking up from suspend mode without losing pre-suspend data, such as configuration data. The invention is particularly adapted to meet USB bus suspend mode power requirements and wake up with pre-suspend configuration data intact. However, it is broadly applicable to any peripheral device that can be placed in a suspend or sleep mode and that needs to awaken from that mode with certain pre-suspend information intact.

In accordance with the invention, the power supply to the peripheral device is split into two power rails, namely, a first power rail that is unswitched and a second power rail that is switched by a transistor. The switched power rail provides power to the components of the peripheral device, such as data processors and memories, other than the bus interface circuit itself (which, in connection with the USB specification, is commonly called the USB client). The bus interface circuit is coupled to receive power via the unswitched power rail.

A power management circuit in the bus interface circuit controls entry into and exit from suspend mode so that they occur in a graceful manner in which no data will be lost. Particularly, when the USB client determines that the device should enter suspend mode, the power management circuit turns off the transistor switch on the switched power rail. This removes power from all of the devices other than the USB client (or bus interface circuit). The clock also is disabled. The bus interface circuit remains powered via the unswitched power rail. The power management circuit then forces all inputs to the USB client from the other components of the peripheral device and all of the outputs from the USB client to the other components to logic 0 so that they do not float during suspend mode, and then finally disables the clock.

More particularly, in accordance with the invention, an event detection circuit in the USB client detects a suspend event on the USB bus. In response, it asserts a suspend signal which is provided directly to the transistor controlling the switched power rail, turning it off. The suspend signal is then clocked through a first flip-flop to generate a first delayed suspend signal. The first delayed suspend signal is supplied to all of the components that have outputs coupled to the USB client. Those components are adapted to set at least those outputs to the USB client to logic level 0 responsive to assertion of the first delayed suspend signal. The first delayed suspend signal is then fed through a second flip-flop to generate a second delayed suspend signal that is delayed an additional clock cycle from the first delayed suspend signal. The second delayed suspend signal is coupled to the clock to disable it.

This technique provides a graceful power shut down in which all pre-suspend configuration data is maintained.

Power up reset operation for the USB client or other bus interface circuit is also handled separately from the other components in the peripheral device. Particularly, the peripheral device comprises two power up reset circuits, namely, a first one for components other than the USB client and a second power up reset circuit for the USB client. Specifically, since the USB client is not powered down in suspend mode, it does not need to be reset when the device wakes up from suspend mode. Hence, it is controlled by a separate power up reset circuit that remains idle during wake up from suspend mode, whereas the other components of the peripheral device do need to go through a reset procedure upon awakening from suspend mode.

When the device wakes up, e.g., via detection of activity on the USB bus or via the remote wake-up pin (RWP) if a USB device, all of the components are awoken in a manner that turns all of the devices back on without adversely affecting pre-suspend configuration data. Particularly, first the power management circuit turns on the switched power rail, restoring power to the processors and memories. The first power up reset circuit properly configures the components. Then the power management circuit enables the clock. Finally, the various outputs of the components are released from being held at logic 0.

DETAILED DESCRIPTION OF THE INVENTION

Figure 1:
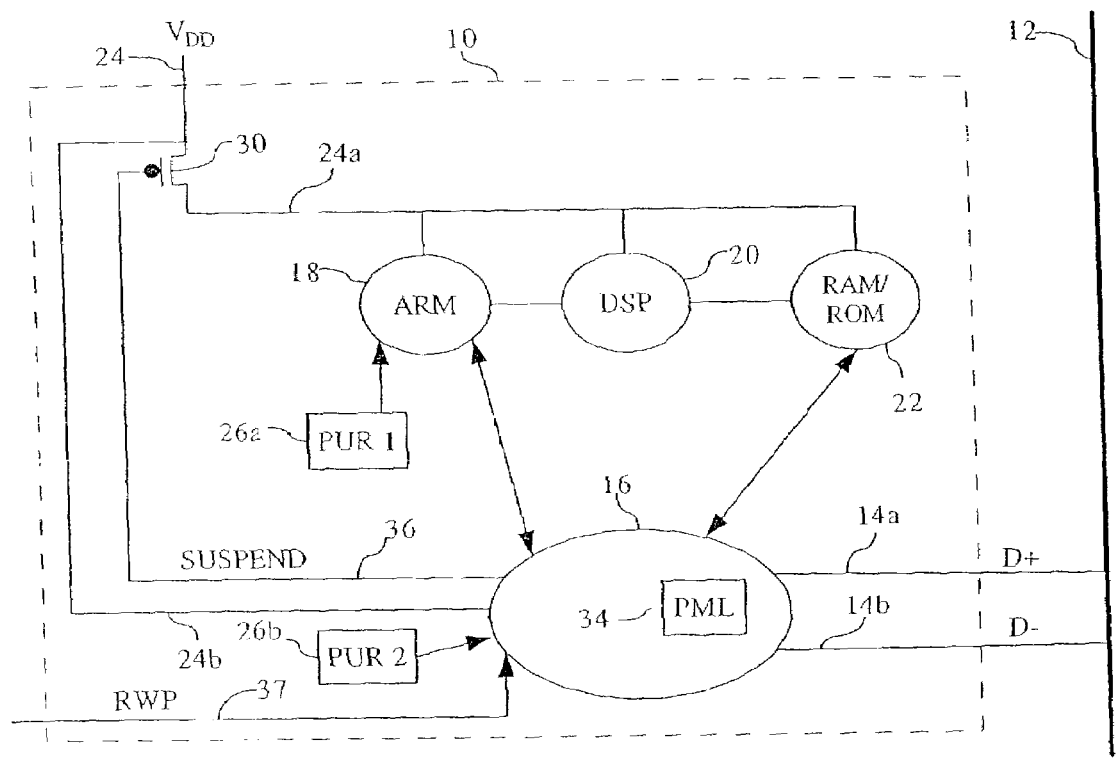
FIG. 1 is a block diagram of an exemplary USB compatible computer peripheral device in accordance with the present invention.

FIG. 1 is a block diagram illustrating exemplary basic components of a USB compliant computer peripheral device, such as a modem, in accordance with the present invention. The peripheral device is shown at 10 and the USB bus is shown at 12. Although shown as a single line, it will be understood by those skilled in the art that a USB bus is a differential bus comprising two lines, D+ and D−. Accordingly, the peripheral device couples to the bus via two differentially driven lines 14a, 14b.

The peripheral device 10 includes a USB bus interface circuit 16, commonly referred to as the USB client, which interfaces to the bus 12 via differential lines 14a and 14b. The USB client 16 interfaces between the bus and the other functional components of the peripheral device 10. Typically, any peripheral device will likely include at least a memory 22 and a processing device such as a digital signal processor (DSP) 20 in order to perform its necessary functions. The memory may comprise more than one memory, such as a random access memory (RAM) for storing temporary data, as well as a read only memory (ROM) for storing permanent data, including, for instance, programming instructions for the DSP 20. In this particular example, the peripheral device 10 includes a second processor 18.

The device 10 also includes a first power up reset circuit 26a, which operates to properly configure the peripheral device when it is initially powered up from an off state as well as when it resumes full operational mode after awakening from suspend state. In accordance with the invention as will be described more fully below, this first power up reset circuit 26a controls power up reset for components of the peripheral device other than the USB client 16, e.g., it controls power up reset for the processors 18, 20 and the memories 22. Preferably, a second power up reset circuit 26b separately controls power up reset for the USB client circuit 16. The USB client has its own separate power up reset circuit 26b because it should be reset only upon initially powering up the device, but does not require resetting upon wake up from suspend mode, since it is fully operational during suspend mode. However, the other components of the peripheral device should be reset, not only upon initial powering up of the device 10, but also upon awakening from suspend mode.

Figure 2:
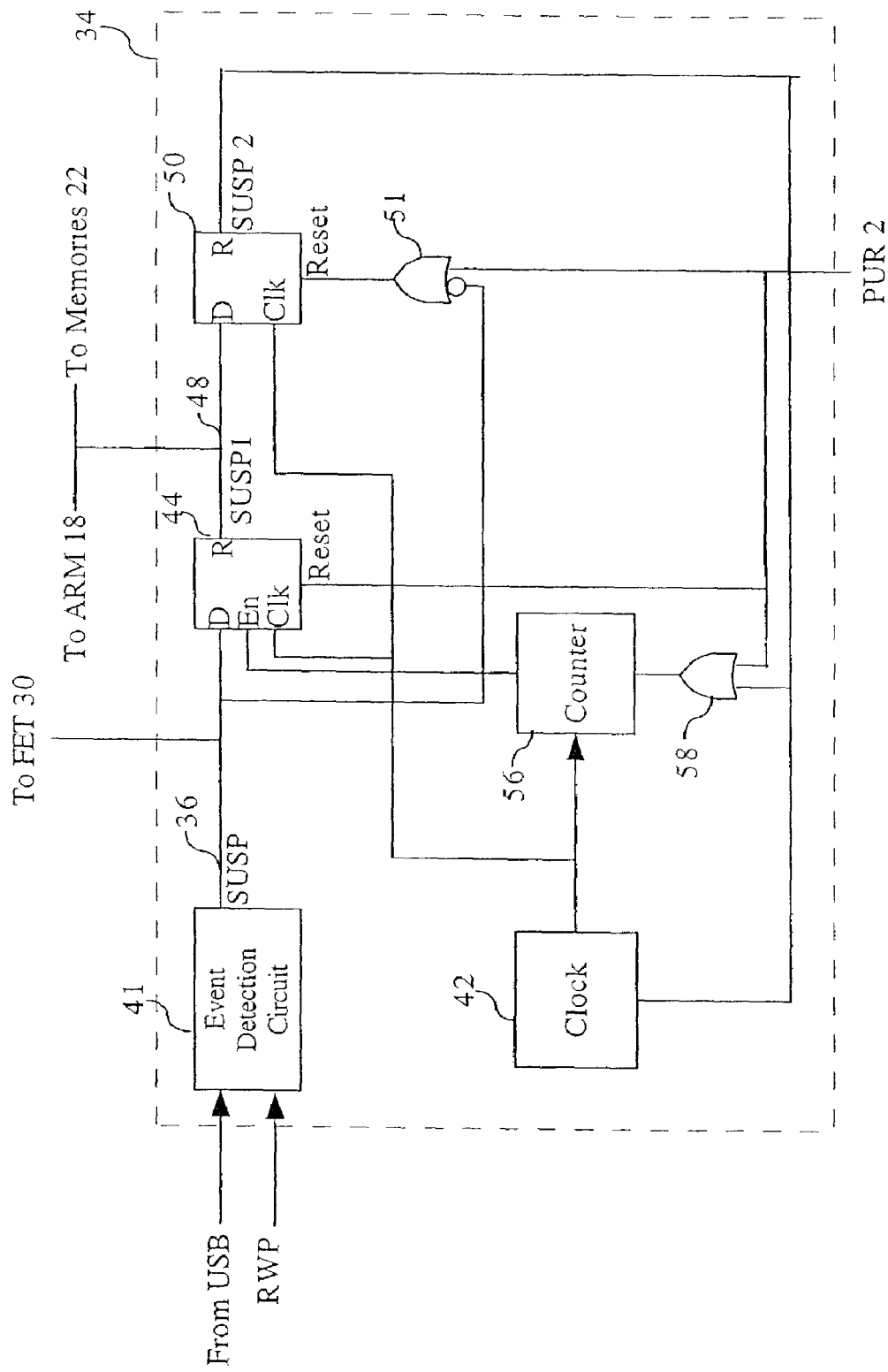
FIG. 2 is a circuit diagram of the power management circuit of FIG. 1.

The USB client includes a power management circuit 34, which is illustrated in detail in FIG. 2. The power management circuit 34 detects events that dictate that the peripheral device 10 should enter suspend mode. For instance, in accordance with the USB specification, a peripheral device should enter suspend mode after 30 milliseconds of inactivity on the USB bus 12. Thus, upon detection of such inactivity, power management circuit 34 controls the components of the device 10, e.g., processors 18, 20, memories 22, and USB client 16 to assure that the device enters and exits suspend mode in a controlled, staged, and graceful manner that preserves pre-suspend configuration data in the processors 18, 20 and memories 22.

The power from $V_{DD}$ power supply 24 is split into two legs 24a and 24b. Power rail 24b provides power to the USB client 16, including power management circuit 34. Power rail 24b is unswitched such that, when the device is powered up, USB client 16 is always fully powered. The other power rail 24a provides power to the other components, i.e., processors 18, 20 and memories 22 through a switch 30, which, for instance, may be a transistor, such as a FET (Field Effect Transistor) with its current flow terminals, e.g., source and drain, coupled between the source 24 and the rail 24a.

The USB client 16, including power management circuit 34, is supplied with power through the unswitched power rail 24b such that it remains fully powered even when the peripheral device 10 is in suspend mode.

Referring now to FIG. 2, power management circuit 34 assures a controlled, staged and graceful shutdown so that configuration data is not lost upon entry into or during suspend state. Power management circuit 34 includes an event detection circuit 41 coupled to bus lines 14a, 14b and is designed to detect the condition(s) that dictate entry into suspend mode, such as inactivity on the bus 12 for 30 milliseconds. Upon those conditions being met, it asserts a suspend signal, SUSP, on line 36. Suspend line 36 is supplied directly to the control terminal, e.g., gate, of switching FET 30 (FIG. 1) to remove power from switched power rail 24a (which supplies power to the processors 18, 20 and memories 22). Suspend line 36 is also provided to the D input of a first flip-flop 44. Flip-flop 44 is clocked by the peripheral device's clock 42. Flip-flop 44 delays the suspend signal one clock cycle and outputs a first delayed suspend signal, SUSP1, on line 48, labeled SUSP1. The first delayed suspend signal, SUSP1, is supplied to processors 18, 20, memories 22 and to other components of USB client block 16. All of those blocks 16, 18, 20 and 22 are configured so that, responsive to the SUSP1 signal being asserted, they set at least certain of their outputs to CMOS logic level 0 so that they do not float during suspend mode. Specifically, output lines from processors 18, 20 and memories 22 that are coupled to inputs of the USB client 16 should be set and held to CMOS level 0 so that they do not float during suspend mode and send erroneous data to the USB client, which is still fully operational. Likewise, any output lines from USB client 16 to any of components 18, 20, 22 also are preferably set and held to CMOS logic level 0 because, with the power removed from components 18, 20, 22, input voltages other than CMOS logic level 0 may could inadvertently change the configuration of the components 18, 20, 22.

The SUSP1 signal output from the first flip-flop 44 also is provided to the input of a second flip-flop 50.

Second flip-flop 50 also is clocked by the peripheral device clock 42 and thus generates a SUSP2 signal on line 52 that is delayed one additional clock cycle from SUSP1. SUSP2 is provided to the USB clock 42 to disable it when asserted. SUSP2 also is provided through OR-gate 58 to counter 56 to clear it when asserted. The purpose of counter 56, OR-gate 58 and the RWP signal at the other input terminal of OR-gate 58 in FIG. 2 pertain primarily to waking up from suspend mode and, thus, will be discussed further below in connection with the portion of this specification concerning waking up from suspend mode.

The present invention shares some similarity to prior art techniques in that the clock of the peripheral device is disabled. However, the clock is turned off in the last stage of the staged power down sequence in order to provide a shut down sequence that preserves pre-suspend configuration data.

At this point, the peripheral device 10 is in suspend mode. In particular, (1) the processors 18 and 20 and memories 22 are turned off, (2) all of the outputs between the powered down components 18, 20, and 22, on the one hand, and the fully powered USB client 16, on the other hand, and vice versa are held at CMOS logic level 0 so as not to alter any values, and (3) the clock 42 is stopped. In this condition, power consumption for peripheral device 10 is reduced to about 10 microamps, easily meeting the USB specification power requirements for suspend mode.

In accordance with the USB specification, peripheral device 10 can be awakened from suspend state in at least two ways. First, in accordance with the USB specification, any activity on the USB bus 12 should awaken the device 10. Alternately, peripheral devices are provided with a remote wake up pin (RWP) 37 which, when asserted, will cause the device to wake up. Event detection circuit 41 detects either event and deasserts the suspend signal responsive thereto. The deassertion of the suspend signal turns FET 30 back on, thus providing power to the processors and memories 18, 20, and 22. The suspend signal is also provided directly to the reset input of the second flip-flop 50 through OR-gate 51, thus causing SUSP2 to become deasserted shortly after SUSP is deasserted (specifically, after the propagation delay of OR-gate 51) and before SUSP1 is deasserted. The clock is still disabled at this time and, hence, the deassertion of the original suspend signal, SUSP, is not clocked into first flip-flop 44 until the clock is enabled. SUSP2 is provided to the counter 56 through the second input of OR-gate 58 and directly to the clock 42, thus turning both the clock 42 and the counter 56 back on.

The count output of counter 56 is supplied to the enable input of first flip-flop 44 such that first flip-flop 44 is enabled after counter 56 counts to a predetermined number. When the counter reaches that predetermined number, flip-flop 44 is enabled so that the next clock pulse will cause SUSP1 to become deasserted. In response to the deassertion of SUSP1, the outputs of the processors 18 and 20 and the memories 22 are no longer held to logic 0. The peripheral device is now completely awake and can resume full operation.

Accordingly, the wake up sequence is not the inverse of the suspend sequence. Particularly, the three stages of the suspend sequence are (1) turning off the power to the processors and memories, (2) switching signal lines between the fully powered USB client, on the one hand, and the unpowered memories and processors, on the other, to logic level 0, and (3) disabling the clock. The three stages of the wake up sequence, however, are (1) turning on the power to the processors and memories, (2) turning on the clock, and (3) releasing the outputs of the circuit components of the peripheral device.

Of course, upon initial powering up of peripheral device 10 when the bus interface circuit 16 itself is initially powered up, the various components also must be powered up in a controlled and graceful manner. Accordingly, a power up reset signal from second power up reset circuit 26b (which powers up the bus interface circuit 16) is provided to (1) the reset input terminal of first flip-flop 44, (2) the second input terminal of OR-gate 51 (the output of which is coupled to the reset input terminal of second flip-flop 50), and (3) the second input terminal of OR-gate 58 (the output of which is coupled to the enable input terminal of counter 56). A review of FIG. 2 will reveal that this arrangement essentially causes processors 18, 20 and memories 22 to wake up exactly as described above with respect to waking up from suspend mode via detection of a wake up event on RWP or the bus via event detection circuit 41.

While we have described a particular embodiment of the invention in which the peripheral device is a USB compliant device, it should be understood by those skilled in the art that the invention has much broader applicability. It is a technique for placing a device in a suspend or sleep mode in which power consumption is minimized while preserving pre-suspend data in the device so that the device can resume full operation without the loss of data.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

We claim:

1. A computer peripheral device adapted to couple to a computer via a bus and further adapted to enter a suspend mode upon occurrence of at least one event, said device comprising:
   a data processing device;
   a bus interface circuit for interfacing between said data processing device and said bus;
   wherein said data processing device is coupled to a power source through a switch and said bus interface circuit is coupled directly to said power source wherein said bus interface circuit retains power during a suspend mode; and
   a power management circuit coupled directly to said power source, said power management circuit being a subcircuit of said bus interface circuit and being adapted to turn off said switch responsive to said event so as to remove power from said data processing device.

2. The computer peripheral device according to claim 1 wherein said peripheral device further comprises a memory, and wherein said memory is coupled to said power source through said switch.

3. The computer peripheral device according to claim 1, wherein said switch is a transistor.

4. The computer peripheral device according to claim 3 wherein said transistor comprises first and second current flow terminals coupled between said power source and said processing device and a control terminal, wherein said power management circuit controls said switch via a SUSPEND signal coupled to said control terminal of said transistor.

5. The computer peripheral device of claim 4 wherein said transistor is a FET.

6. The computer peripheral device of claim 1 further comprising a clock and wherein said power management circuit is further adapted to disable said clock in suspend mode.

7. The computer peripheral device of claim 6 wherein said power management circuit delays said disabling of said clock until after said power is removed from said processor.

8. The computer peripheral device of claim 7 wherein said power management circuit further generates a control signal, after said switch is turned off and before said clock is disabled, said control signal coupled to said bus interface circuit and said processor, that instructs them to drive their outputs to each other to a particular logic level; and
    wherein said processor and said bus interface circuit are configured to drive their outputs to each other to said particular logic level responsive to said control signal.

9. The computer peripheral device of claim 1 wherein said peripheral device couples to said power source via said bus.

10. The computer peripheral device of claim 1 wherein said peripheral device couples to a USB bus.

11. A computer peripheral device adapted to couple to a computer via a bus and further adapted to enter a suspend state responsive to at least one event, said device comprising:
    at least one data processing device;
    at least one memory operatively coupled to said data processing device;
    a bus interface circuit for interfacing between said bus, on the one hand, and said data processing device and memory, on the other hand, wherein said data processing device is coupled to a power source through a switch and said bus interface circuit is coupled directly to said power source wherein said bus interface circuit retains power during a suspend mode; and
    a power management circuit coupled directly to said power source, said power management circuit being a subcircuit of said bus interface circuit and being adapted to turn off said switch responsive to said event so as to remove power from said data processing device.

12. The computer peripheral device of claim 11 wherein said power management circuit generates a SUSPEND signal that is asserted responsive to said event and wherein said SUSPEND signal is provided to a control terminal of said switch for turning said switch off when asserted and on when unasserted.

13. The computer peripheral device of claim 12 further comprising a clock and wherein said power management circuit further comprises at least one flip-flop having an input terminal coupled to receive said SUSPEND signal and an output terminal at which a delayed version of said SUSPEND signal is generated, said delayed SUSPEND signal coupled to said clock and operative to disable said clock when asserted.

14. The computer peripheral device of claim 13 wherein said flip-flop comprises first and second flip-flops coupled in series and wherein said first flip-flop generates a first, delayed SUSPEND signal that is provided to said memory and said data processing device to cause them to drive their outputs that are coupled to said bus interface circuit to a particular logic level when said SUSPEND signal is asserted and wherein said second flip-flop generates a second, delayed SUSPEND signal that is delayed a greater period than said first, delayed SUSPEND signal, said second delayed suspend signal coupled to said clock to disable said clock when asserted.

15. The computer peripheral device of claim 14 wherein said power management circuit further comprises a counter operatively coupled to count responsive to clock pulses from said clock and wherein said second, delayed SUSPEND signal is further coupled to said counter to disable said counter when said second delayed SUSPEND signal is asserted, said counter having an output coupled to an enable input terminal of said first flip-flop so as to enable said first flip-flop after a predetermined number of clock pulses from said clock and whereby, upon exiting said SUSPEND state, said first delayed SUSPEND signal is delayed said predetermined number of clock pulses after said clock is enabled.

16. The computer peripheral device of claim 15 wherein said switch is a transistor.

17. The computer peripheral device of claim 11 wherein said peripheral device couples to said power source via said bus.

18. The computer peripheral device of claim 17 wherein said peripheral device couples to a USB bus.

19. A method of placing a computer peripheral device that is adapted to couple to a computer via a bus in a suspend state responsive to at least one event without losing configuration data, said method comprising the steps of;
    (1) splitting power to said peripheral device into a first, switched power rail coupled to a processing device of said peripheral device and a second, unswitched power rail coupled to a bus interface circuit of said peripheral device wherein said bus interface circuit retains power during a suspend state; and
    (2) enabling a subcircuit of said bus interface circuit to turn off said first switched power rail in response to said event.

20. The method of claim 19 wherein said peripheral device further comprises a memory, said method further comprising the step of;
    (3) providing power to said memory via said first, switched power rail.

21. The method of claim 20 wherein said peripheral device further comprises a clock, said method further comprising the step of:
    (4) disabling said clock after step (2).

22. The method of claim 21 further comprising the steps of:
    (4) driving outputs of said processing device and said memory to said bus interface circuit to a first logic level after step (2) and before step (3); and
    (5) driving outputs of said bus interface circuit to said processing device and said memory to said first logic level after step (2) and before step (3).

23. The method of claim 22 further comprising the steps of:
    (6) responsive to a second event indicating that said peripheral device should exit the suspend state, turning said first, switched power rail on.
    (7) responsive to said first, switched power rail being turned on, enabling said clock;
    (8) responsive to said clock being enabled, releasing said outputs of said processing device, memory and bus interface circuit from said first logic state.

24. The computer peripheral device of claim 23 wherein step (8) comprises delaying step (8) a predetermined number of clock cycles after step (7).

* * * * *